Sept. 14, 1926.  M. H. DAMERELL  1,599,609
INDICATING MACHINE
Filed Nov. 12, 1924    3 Sheets-Sheet 2
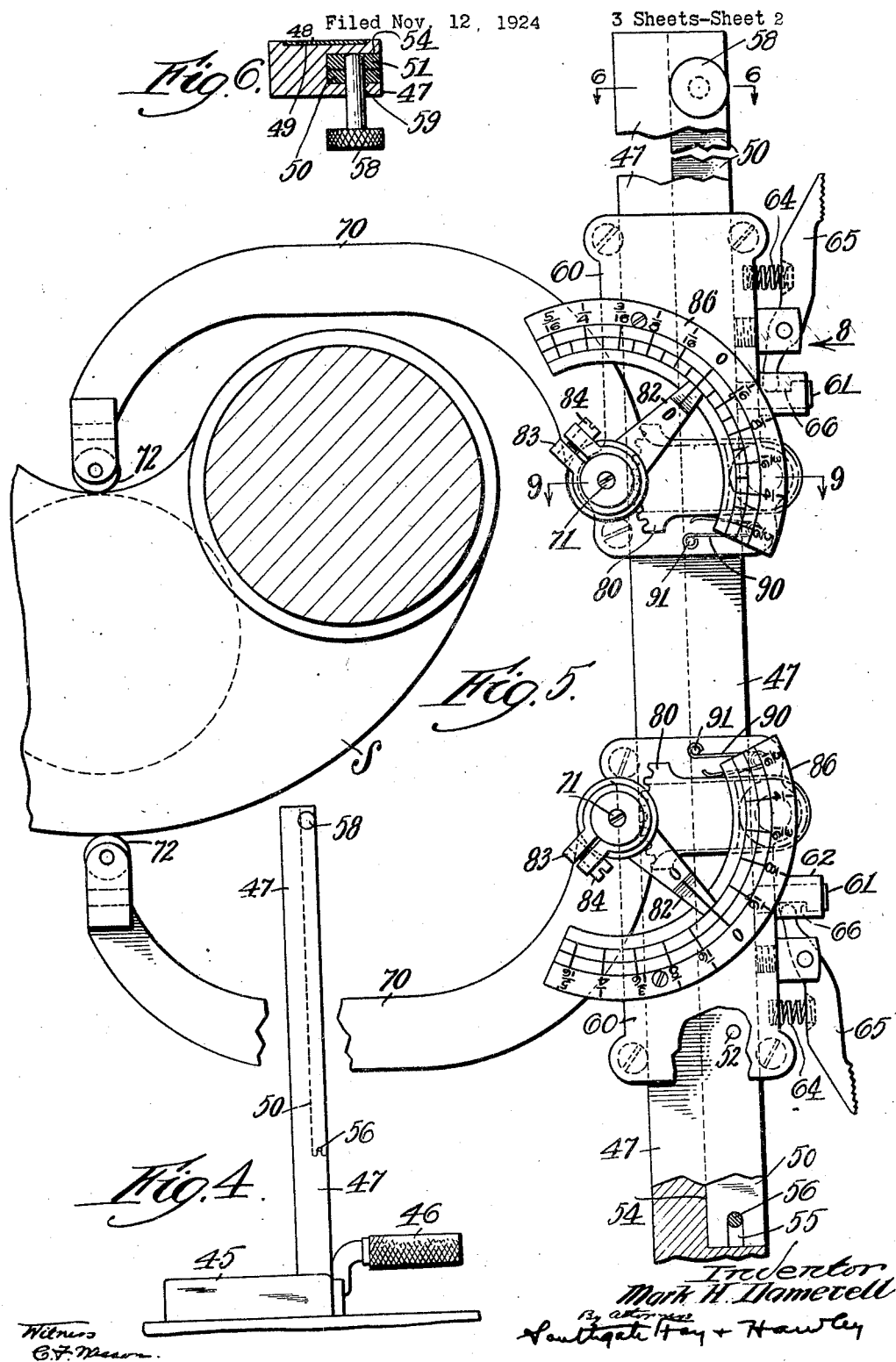

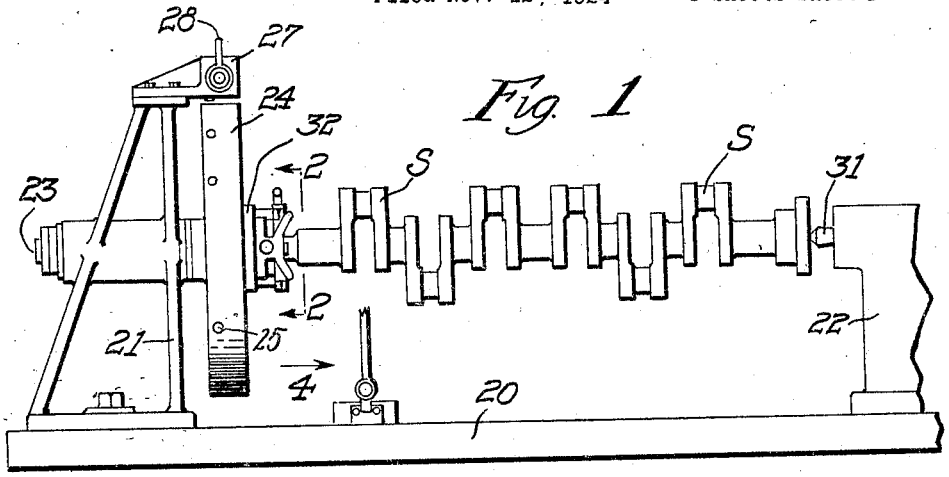
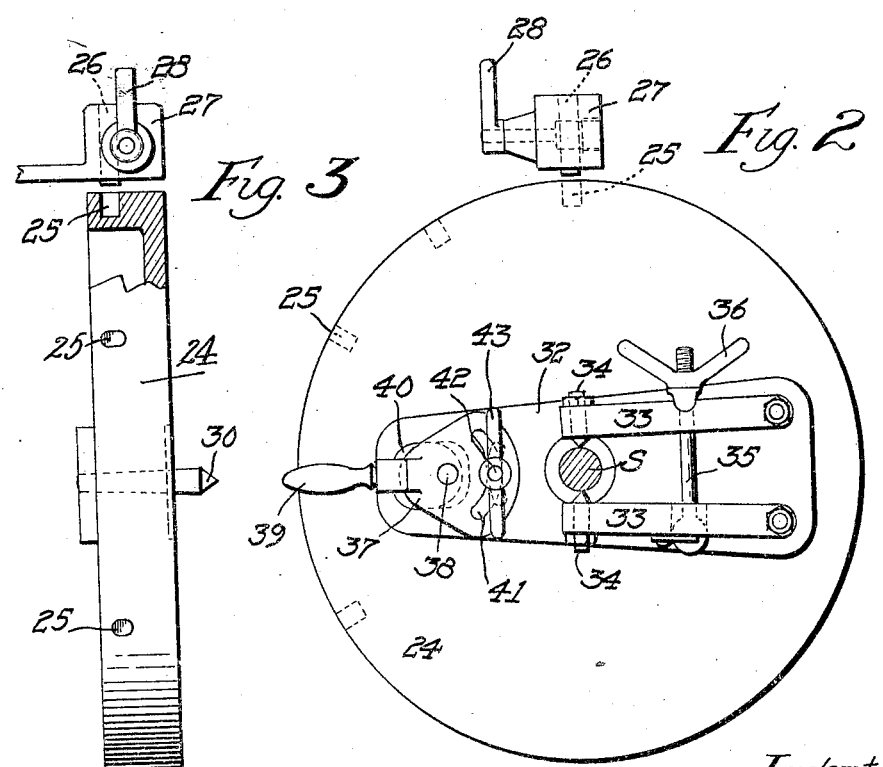

Sept. 14, 1926.
M. H. DAMERELL
1,599,609
INDICATING MACHINE
Filed Nov. 12, 1924 3 Sheets-Sheet 3
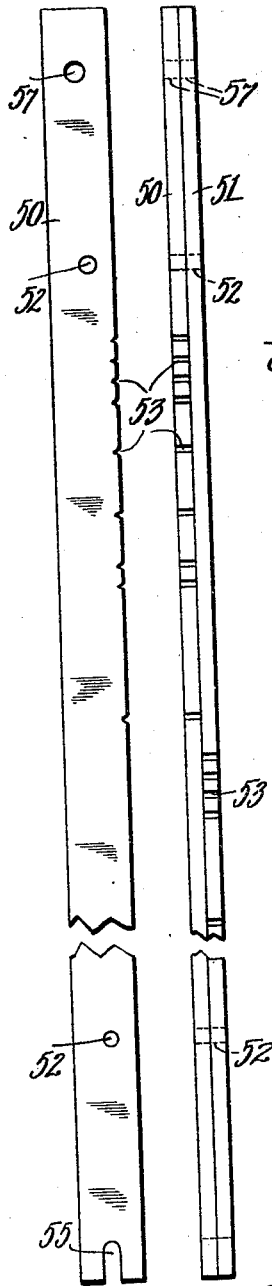
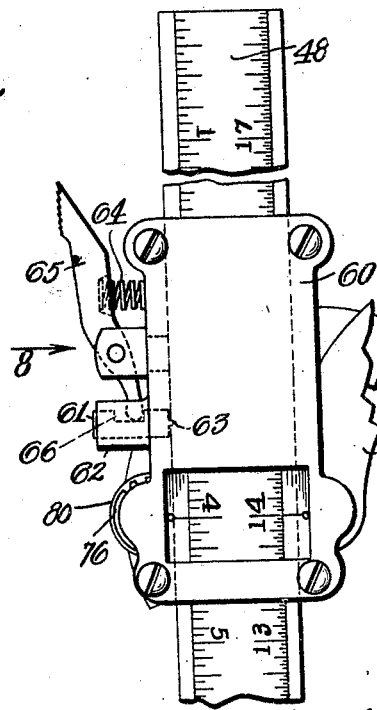
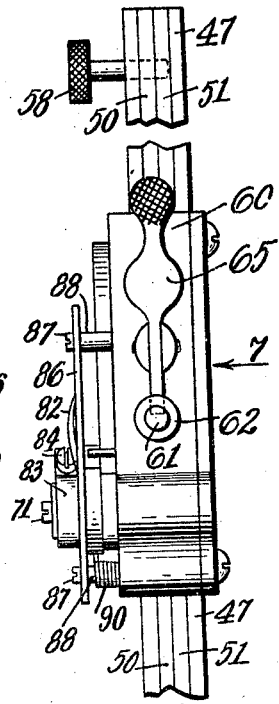
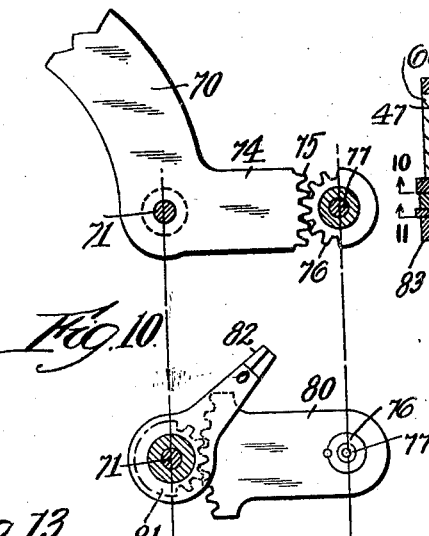
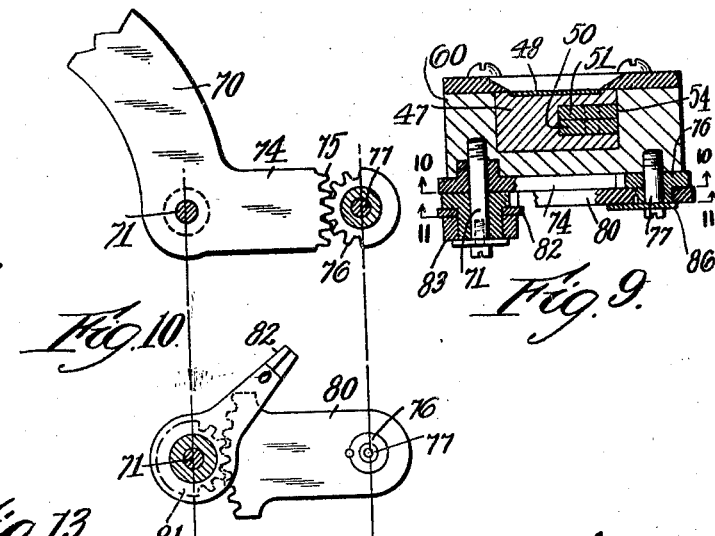
Inventor
Mark H. Damerell
By Attorneys
Southgate Fay & Hawley Patented Sept. 14, 1926.

1,599,609

UNITED STATES PATENT OFFICE.

MARK H. DAMERELL, OF WORCESTER, MASSACHUSETTS, ASSIGNOR TO WYMAN-GORDON COMPANY, OF WORCESTER, MASSACHUSETTS, A CORPORATION OF MASSACHUSETTS.

INDICATING MACHINE.

Application filed November 12, 1924. Serial No. 749,550.

This invention relates to a machine by which certain desired information in regard to multi-throw crank shafts may be conveniently indicated and made readily available. In the production of such crank shafts for automobile engines and for other high speed engines, it has been found necessary to distribute the metal with great care and to hold all variations from the standard within very close limits. It is the object of my invention to provide an indicating machine which may be used to test a crank shaft at a large number of different points and to indicate any deviation from the standard at each such point. A further object is to provide such a machine which may be readily adapted to different sizes and types of crank shafts, with very little loss of time or labor.

My invention further relates to arrangements and combinations of parts which will be hereinafter described and more particularly pointed out in the appended claims.

A preferred form of the invention is shown in the drawings in which—

Fig. 1 is a front elevation of my improved machine, with a portion of the indicating device omitted for the sake of clearness;

Fig. 2 is a transverse sectional elevation, taken along the line 2—2 in Fig. 1;

Fig. 3 is an enlarged partial front elevation, partly in section, and showing the disc and locking device therefor;

Fig. 4 is a side elevation of the base and standard for my improved indicating device;

Fig. 5 is an enlarged side elevation of the indicating device, with certain parts of the standard broken away;

Fig. 6 is a detail sectional plan view taken along the line 6—6 in Fig. 5;

Fig. 7 is a partial side elevation of the indicating device, looking in the opposite direction from Fig. 5;

Fig. 8 is a partial front elevation, looking in the direction of the arrow 8 in Figs. 5 and 7;

Fig. 9 is a detail sectional plan view, taken along the line 9—9 in Fig. 5;

Figs. 10 and 11 are detail sectional elevations, taken along the lines 10—10 and 11—11 in Fig. 9; and Figs. 12 and 13 are side and front elevations respectively of the gauge bars used in my improved indicating device.

Referring to the drawings, I have shown in Figs. 1, 2 and 3 an indexing mechanism by which a crank-shaft may be supported for rotation and may be accurately positioned in any desired number of selected angular relations. The indexing mechanism is substantially similar to that shown in my co-pending application, Serial No. 749,549, filed Nov. 12, 1924, in which application the indexing mechanism is fully described and claimed.

For the purposes of the present application, it is sufficient to state that my improved indicating machine comprises a bed 20 having a flat finished upper surface upon which an indexing head 21 and a tail stock 22 are firmly secured. The head 21 supports a spindle 23 for an index plate or disc 24 having a series of holes or openings 25, spaced about its periphery. A plunger 26 is mounted in a bracket 27 extending forward from the head 21. The plunger 26 may be forced downward by a handle 28, causing it to enter a hole 25 in the disc 24. The holes 25 are spaced angularly about the disc 24 to correspond to desired angular positions of the crank shaft S.

The shaft S is commonly provided with center holes and is mounted upon a live center 30 and a dead center 31, with its axis parallel to the bed 20. A clamping plate 32 is provided with arms 33 pivoted thereon and having spurs 34 which may be forced against the crank-shaft S by a clamping bolt 35 and nut 36. An eccentric or cam plate 37 is pivoted at 38 on the index disc 24 and is provided with a handle 39 by which it may be turned about the pivot 38. The eccentric portion of the cam plate fits within a recess 40 in the cam plate 32.

The cam plate is provided with a segmental slot 41 through which extends a stud 42 fixed in the disc 24. The stud 42 is provided with a wing nut 43 by which the clamping plate 32 and the cam plate 37 may be secured to the disc 24. When the wing nut 43 is loosened, the eccentric or cam plate 37 may be turned by the handle 39, producing limited angular adjustment between the plate 32 and the disc 24. In this manner the crank shaft S may be accurately adjusted to correspond in initial position to the index holes 25. All parts thus far described are as shown in my co-pending application and are not specifically claimed herein.

The indicating device forming the remaining portion of my indicating machine comprises a base 45 carefully finished upon its lower face and having a handle 46. The base 45 is slidable upon the bed 20 to a desired position and supports a post or standard 47 fixed therein. The standard 47 has a graduated scale 48 (Figs. 6 and 7) disposed in a recess 49 in one side of the standard 47.

A pair of gauge bars 50 and 51 are secured together by rivets or pins 52 (Fig. 13) and are each provided with a series of notches 53 for a purpose to be described. The assembled bars 51 and 52 are mounted in a groove or longitudinal recess (Fig. 6) in the standard 47. At their lower ends, the bars 50 and 51 are slotted as indicated at 55 and fit over a cross pin 56 (Fig. 5) in the standard 47. At their upper ends, the gauge bars are provided with aligned openings 57 adapted to receive a removable stud 58 extending through a corresponding opening 59, Fig. 6 in the upper end of the standard 47. The gauge bars 50 and 51 may be easily inserted and secured in the groove or opening 54 and may be readily removed and replaced by other gauge bars.

In the commercial use of my indicating machine, it is customary to provide a pair of gauge bars 50 and 51 for each different type or size of crank-shaft to be indicated, each set of bars being provided with notches 53 accurately located with respect to selected points of measurement on a particular crank-shaft.

Upper and lower indicating members are mounted on the standard 47 and each includes a block or slide 60 slidable on the standard 47. A locking plunger 61 is mounted in a transverse hub or bearing 62 on the side of each slide 60 and is provided with a pointed projection 63 (Fig. 7) adapted for engagement in the different notches 53 of the gauge bars 50 or 51.

The plungers 61 are so positioned in the slides 60 that the plunger in the upper slide will enter the notches in the bar 50 and the plunger in the lower slide will enter the notches in the bar 51. The plungers 61 are normally forced into the gauge bars by springs 64 (Fig. 7) acting through release levers 65. One end of each lever 65 enters a recess 66 in the side of its plunger 61. Each slide 60 may be released for movement along the standard 47 by applying pressure to its release lever 65, sufficient to overcome the spring 64 and withdraw the plunger 61.

A contact member 70 is pivoted at 71 on each slide 60 and is provided with a contact roll 72 at its outer end. Each member 70 has a projection 74 provided with segment gear teeth 75 engaging a segment pinion 76 (Fig. 10) and mounted on a stud 77 (Fig. 9) on the slide 60. A segment arm 80 is fixed on the hub of the pinion 76 and engages a segment pinion 81 pivoted on the stud 71. The pinion 81 has an indicating arm 82 fixed thereto.

The arm 82 is preferably secured to the pinion 81 by a split hub 83 (Fig. 5) and binding screw 84, this construction permitting adjustment of the arm 82 after the machine is assembled. The indicating arm 82 co-operates with a graduated segmental scale plate 86 secured by screws 87 (Fig. 8) to studs 88 projecting outward from the slide 60.

A spring 90 (Fig. 5) is coiled about the lower stud 88 and has one end fixed by a stud 91, to the slide 60. The free end of the spring engages the segment arm 80 and acts through the gearing previously described to swing the contact member 70 toward the surface to be indicated.

The upper and lower indicating members are exact duplicates in construction, with the exception that the lower member is inverted and the parts reversed.

In the use of my improved indicating machine, a pair of gauge bars 50 and 51 are selected, corresponding to the particular type and size of shaft to be tested. These selected gauge bars are secured in the standard 47 as previously described. The crank shaft to be tested is then placed upon the centers of the indexing device and is secured to the index disc 24 by means of the clamping plate 32 and the parts carried thereby. The crank shaft is brought into the exact desired angular relation to the index disc 24 by use of the handle 39 and the eccentric or cam plate attached thereto.

After the crank shaft is thus accurately positioned, the indicating devices are used to check up the crank shaft at any desired number of different points and to give any desired information as to variations from the standard shaft. The gauge bars 50 and 51 are provided with notches corresponding to the correct vertical positions of the slides 60 for all desired items of information.

In Fig. 5, the slides 60 are positioned to indicate the upper and lower surfaces of one of the curved connecting cheeks of a six throw crank shaft. If these curved surfaces are correctly formed, the index arms 82 will indicate zero on the graduated scales 86 as shown in Fig. 5. Any desired number of notches may be provided in the gauge bars, corresponding to any desired number of different items of information. It is customary to provide notches so that the indicating devices will show the outside diameters of the different crank pins on two or more different diameters, the diameters of the different flanges and collars on the main portion of the crank shaft, the outside radius of the counterweight, and other similar items of information. The slides 60 are also provided with index or zero lines as shown in Fig. 7, by which direct readings of the slide positions may be made in inches or other desired scale divisions on the scale 48.

Having thus described my invention and the advantages thereof, I do not wish to be limited to the details herein disclosed otherwise than as set forth in the claims, but what I claim is:—

1. In an indicating machine, an indicating device comprising a base, a standard fixed thereto and provided with a groove, a contact member, a slide supporting said member, and means to lock said slide to said standard in a plurality of different predetermined vertical positions, said means including a gauge bar mounted in said groove, and a locking member on said slide cooperating with said gauge bar to lock said slide in a selected vertical position.

2. In an indicating machine, an indicating device comprising a base, a standard fixed thereto, a contact member, a slide supporting said member, and means to lock said slide to said standard in a plurality of different predetermined vertical positions, said means including a gauge bar fixed in said standard and having a series of notches therein, and a locking plunger in said slide position to enter a selected notch in said gauge bar and to thereby fix said slide in a selected vertical position.

3. In an indicating machine, an indicating device comprising a base, a standard fixed thereto, a contact member, a slide supporting said member, and means to lock said slide to said standard in a plurality of different predetermined vertical positions, said means including a gauge bar detachably secured in said standard and having a series of notches therein, and a locking plunger in said slide positioned to enter a selected notch in said gauge bar and to thereby fix said slide in selected vertical position, said notches having a definite relation to selected points of measurement in a standard crank-shaft of a particular type and size.

4. In an indicating machine, an indicating device comprising a base, a standard, a pair of contact members, a separate slide for each member, and a separate gauge bar on said standard for each slide, each effective to locate its slide and its contact member in a plurality of selected vertical positions.

5. In an indicating machine, a standard, a slide thereon, a contact member pivoted on said slide, an index arm on said slide, multiplying connections between said member and arm, and a segmental scale with which said arm cooperates to indicate deviations from the established standard of crank-shaft measurements.

6. In an indicating machine, a standard having a longitudinal recess therein, a pair of gauge-bars detachably secured in said recess, a pair of contact members, slides for said members, and locking devices on said slides each cooperating with one of said gauge-bars to simultaneously position its slide and member.

7. In an indicating machine, a standard provided with a groove, a gauge bar detachably mounted in said groove, a contact member, a support for said contact member and means on said support cooperating with said gauge bar to position said support at different selected points on said standard corresponding to different measurements of a crank shaft of a particular type and size.

8. In an indicating machine, a standard provided with a groove, a gauge bar detachably mounted in said groove, a contact member, a support for said contact member, and means on said support cooperating with said gauge bar to position said support at different selected points on said standard corresponding to different measurements of a crank shaft of a particular type and size, said gauge bar being removable from the standard and replaceable by another gauge bar corresponding to a crank shaft of a different type or size.

9. In an indicating machine, an indicating device comprising a base, a standard provided with a groove, a contact member, a slide for said member, and a gauge bar for said slide detachably mounted in said groove effective to locate said slide and its contact member in a plurality of selected vertical positions.

10. In an indicating machine, a standard having a longitudinal recess therein, a gauge bar detachably secured in said recess, a contact member, a slide for said member, and a locking device on said slide co-operating with said gauge-bar to vertically position its slide and member.

In testimony whereof I have hereunto affixed my signature.

MARK H. DAMERELL.